United States Patent [19]
McTigue

[11] 3,755,610

[45] Aug. 28, 1973

[54] ELECTRICALLY CONDUCTIVE CABLE

[75] Inventor: Frank H. McTigue, Wilmington, Del.

[73] Assignee: Hercules Incorporated, Wilmington, Del.

[22] Filed: Sept. 15, 1971

[21] Appl. No.: 180,842

[52] U.S. Cl............... 174/23 C, 117/232, 174/113, 174/116
[51] Int. Cl.......................... H02g 15/20, B44d 1/42
[58] Field of Search.................. 174/23 C, 113, 116; 117/232

[56] References Cited
UNITED STATES PATENTS
3,668,298  6/1972  Hawkins.............................. 174/23
3,354,117  11/1967  Schmidt et al................... 260/45.85

Primary Examiner—William D. Martin
Assistant Examiner—Harry J. Gwinnell
Attorney—William S. Alexander and Edwin H. Dafter, Jr.

[57] ABSTRACT

Improvements are taught in the preparation of olefin coated electrically conductive cables wherein the space between individual singles wires within the cable is filled with petroleum jelly. The improvement comprises stabilizing the polymer coating on the singles wires with a specified thiobisphenol phosphite which is particularly resistant to extraction by petroleum jelly.

4 Claims, No Drawings

ELECTRICALLY CONDUCTIVE CABLE

This invention relates to a new and improved electrical conductor suitable for use in underground installations. More specifically it relates to electrical or communications cables comprised of a plurality of individual polyolefin coated wires.

An electrical or communications cable is comprised of a great number of pairs of single conductive wires. Each of these singles is coated with a dielectric material to insulate them all individually from one another. A large number of these singles are then collected into a bundle which is the cable. The cable is coated on the outside with a sheath of a dielectric material to make an integral structure.

As is to be expected, collecting a plurality of round wires into a cable results in a large volume of unoccupied space between wires. In the normal course of things this is simply "dead space" which becomes filled with air. In many applications this is satisfactory since air is an excellent dielectric. However, when the cable is intended to be installed underground, this type cable is usually not satisfactory. The reason for this is that an underground cable is frequently in contact with water. If a flaw develops in the outer sheath, water can leak into the dead space in the cable and this can eventually lead to trouble such as, e.g., shorting of a pair of wires.

In order to keep water out of these cables in underground installations, it has become common practice to fill the cable with an inexpensive liquid or low-melting solid dielectric. The most preferred material found for this application is petrolatum or petroleum jelly — i.e., a low molecular weight, amorphous, semi-solid hydrocarbon mixture melting at about 34° to 60°C. The filling composition actually used in the cable is composed of 80 to 95 percent petrolatum and 5 to 15 percent low or medium density polyethylene. The filling compounds become fluid at 100° to 125°C.

Unfortunately, the use of petroleum jelly is not a satisfactory solution to the problem, when the dielectric coating on the individual wire strands or the sheath is a polyolefin such as polyethylene or polypropylene. These materials contain heat stabilizers and copper inhibitors which are readily extracted therefrom by the petroleum jelly which is chemically very similar to the polymer in its structure. Heat stabilizers and copper inhibitors are needed in polyolefins for use in filled cable to protect the polymer, not only in the buried portion of the cable, but especially in the "pedestals" where the cables are brought above ground to make connections. These pedestals get quite warm in summer.

It is the purpose of this invention to provide an improved polyolefin jacketed electrical conductor which is not subject to the same high degree of stabilizer extraction as is experienced with prior art cables. Concisely stated, the invention is an electrically conductive cable consisting essentially of a plurality of conducting wires, said wires being individually coated with an olefin hydrocarbon polymer containing, as a stabilizer, a hindered thiobisphenol phosphite and having the space between said wires filled with an amorphous, semi-solid, low molecular weight petroleum hydrocarbon melting at about 34° to 60°C. Although the thiobisphenol phosphites have been recognized as polyolefin stabilizers, see U.S. Pat. No. 3,354,117, their ability to resist extraction by petrolatum has been hitherto unrecognized.

The jacketed electrical conductors according to this invention can have as their electrically conductive member either aluminum or copper according to known prior art. The make-up of the conductive member apart from the coating thereof forms no part of the invention.

As stated, the electrical conductors are coated with a solid polyolefin, i.e., a homopolymer of a single olefin or a copolymer of two or more olefins. Preferred polyolefins are those based on ethylene and propylene, for example, polyethylene, polypropylene and copolymers containing a preponderance of either ethylene or propylene.

The thiobisphenol phosphites employed in the practice of this invention, which are readily prepared by the reaction of PCl$_3$ with a thiobis hindered phenol, having the general formula:

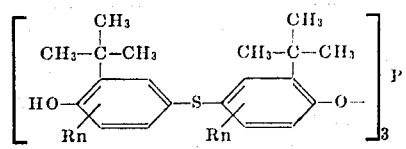

where R is methyl or t-butyl and $n$ is from 0 to 2.

The preferred thiobisphenol for use in preparing the thiobisphenol phosphites of this invention is 4,4'-thiobis-(6-t-butyl-m-cresol). Others which can be employed include e.g. 4,4'-thiobis-(6-t-butyl phenol), 4,4'-thiobis-(2,6-di-t-butyl-m-cresol), 4,4'-thiobis-(2,6-di-t-butyl phenol) and 4,4'-thiobis-(2-methyl-6-t-butyl phenol), 2,2'-thiobis(6-t-butyl p-cresol), 3,3'-thiobis(6-t-butyl p-cresol), 2,2'-thiobis(6-t-butyl phenol) and 3,3'-thiobis(6-t-butyl phenol).

The thiobisphenol phosphite is employed in concentrations of about 0.05 to 1.0 percent bmethane, bis-(4-oxy-3-methyl-phenyl)-pentane, bis-(2-oxy-phenyl)-cyclohexane, 4,4'-thiobis-(6-t-butyl-m-cresol).

Naphthols and bisnaphthols, for example, -dinaphthol, bis-(2-oxy-naphthyl)-methane, bis-(2-oxy-3-nonyl-naphthyl)-methane, 1,1,3-tris-(2-methyl-5-t-butyl-4-hydroxyphenyl)butane, terpene-substituted phenols and bisphenols, for example, 6-isobornyl-o-cresol, 6-isobornyl-1,2,4-xylenol, 2,6-di-isobornyl-p-cresol, 6-isobornyl-3,4-dimethyl-phenol, 2,6-di-isobornyl-3,4-dimethyl-phenol, 6,6'-methylene-bis-(2-isobornyl-4-methylphenol), 6,6'-methylene-bis-(2,4-di-isobornyl-phenol), can also be used.

Particularly suitable thioether compounds are those of aliphatic alcohols containing four to 18 carbon atoms such, for example, as di-octyl-sulphide, di-dodecyl-sulphide, di-octadecyl-sulphide and bis(2-0xy-naphthyl)-sulphide and the corresponding polythioethers, for example di-dodecyl-disulphide, di-octyl-trisulphide, di-octadecyl-tetrasulphide, and bis(2-oxynaphthyl)-disulphide esters, preferably those of aliphatic alcohols containing four to 18 carbon atoms such, for example, as thio-di-acetic acid dodecyl ester, thio-di-propionic acid lauryl ester, di-thio-di-butyric acid, octadecyl ester, di-thio-divaleric acid butyl ester, trithio-didecane-carboxylic acid nonyl ester, tetrathio-dibutyric acid octyl ester and s-t-butyl-mercapto-acetic acid lauryl ester. Salts of the thiodialkanoic acid esters such as zinc, calcium or sodium salts can also be used.

Petrolatum compositions fall into generally two main classifications — those having high oil content and those having low oil content. The invention is applicable to either type of petrolatum. Generally, the high oil petrolatum has a melting point of about 45° to 55°C., Saybolt viscosity of about 65 to 73, and contains about 25 to 35 percent oil or methyl ethyl ketone soluble low molecular weight hydrocarbons. The low oil petrolatum has a melting point of about 43° to 60°C., Saybolt viscosity of about 90 to 115, and contains about 12 to 15 percent oil.

The extractability of the various stabilizers is determined by compounding the stabilizer into the polymer and compression molding th a polyolefin sucmethane,
  bis-(4-oxy-3-methyl-phenyl)-pentane,
  bis-(2-oxy-phenyl)-cyclohexane,
  4,4'-thiobis-(6-t-butyl-m-cresol).

Naphthols and bisnaphthols, for example, -dinaphthol, bis-(2-oxy-naphthyl)-methane, bis-(2-oxy-3-nonyl-naphthyl)-methane, 1,1,3-tris-(2-methyl-5-t-butyl-4-hydroxyphenyl)butane, terpene-substituted phenols and bisphenols, for example, 6-isobornyl-o-cresol, 6-isobornyl-1,2,4-xylenol, 2,6-di-isobornyl-p-cresol, 6-isobornyl-3,4-dimethyl-phenol, 2,6-di-isobornyl-3,4-dimethyl-phenol, 6,6'-methylene-bis-(2-isobornyl-4-methylphenol), 6,6'-methylene-bis-(2,4-di-isobornyl-phenol), can also be used.

Particularly suitable thioether compounds are those of aliphatic alcohols containing four to 18 carbon atoms such, for example, as di-octyl-sulphide, di-dodecyl-sulphide, di-octadecyl-sulphide and bis(2-Oxy-naphthyl)-sulphide and the corresponding polythioethers, for example di-dodecyl-disulphide, di-octyl-trisulphide, di-octadecyl-tetrasulphide, and bis(2-oxynaphthyl)-disulphide esters, preferably those of aliphatic alcohols containing four to 18 carbon atoms such, for example, as thio-di-acetic acid dodecyl ester, thio-di-propionic acid lauryl ester, di-thio-di-butyric acid, octadecyl ester, di-thio-divaleric acid butyl ester, trithio-didecane-carboxylic acid nonyl ester, tetrathio-dibutyric acid octyl ester and s-t-butyl-mercapto-acetic acid lauryl ester. Salts of the thiodialkanoic acid esters such as zinc, calcium or sodium salts can also be used.

Petrolatum compositions fall into generally two main classifications — those having high oil content and those having low oil content. The invention is applicable to either type of petrolatum. Generally, the high oil petrolatum has a melting point of about 45° to 55°C., Saybolt viscosity of about 65 to 73, and contains about 25 to 35 percent oil or methyl ethyl ketone soluble low molecular weight hydrocarbons. The low oil petrolatum has a melting point of about 43° to 60°C., Saybolt viscosity of about 90 to 115, and contains about 12 to 15 percent oil.

The extractability of the various stabilizers is determined by compounding the stabilizer into the polymer and compression molding the polymer into a 10 mil film. A portion of this film 1½ × 1 inch is placed in 50 ml. of petroleum jelly and treated for 18 hours at 85°C. (jelly to polymer ratio = about 175 to 1). The film is then removed from the petroleum jelly and wiped substantially clean. A qualitative measure can be obtained by means of a 180° DTA induction time. A quantitative measure can be obtained by infrared or U.V. analysis before and after the extraction.

The induction time is determined on a Perkin-Elmer Differential Scanning Calorimeter by heating the film on a previously oxidized copper surface at 180°C. in an oxygen atmosphere. The energy response of the specimen is plotted as a function of time and the time is recorded at which the initial exotherm occurs in the curve. This time is the induction time. To be commercially acceptable, a formulation should have an induction time of at least about 15 minutes.

Quantitatively, the amount of stabilizer remaining after the petroleum jelly treatment should be at least about 25 percent of the original in order for a composition to be commercially attractive.

The invention is illustrated in the following examples. Parts and percentages are by weight unless otherwise indicated.

EXAMPLES 1 to 6

A crystalline propylene--ethylene block copolymer containing about 22 percent ethylene and having an intrinsic viscosity of 3.7 was compounded with the additives shown in the table below and extruded and pelletized to form molding powder. The various formulations were compression molded to form films 4 × 4 × 0.01 inch at 215°C. for 5 minutes. Test specimens 1.5 × 1.0 inch were cut from these and were treated in 50 ml. of high-oil petroleum jelly at 85°C. for 18 hours.

The treated specimens were tested for D.T.A. induction time in contact with copper under oxygen at 180°C. They were also analyzed for residual thiobisphenol-phosphite by ultraviolet absorption spectrascopy.

Pertinent data concerning these examples are recorded in the following table.

TABLE

| Example | 1 | 2 | 3 | 4 | 5 | 6 | Control* |
|---|---|---|---|---|---|---|---|
| Ingredients: | | | | | | | |
| Polymer | 100 | 100 | 100 | 100 | 100 | 100 | 100 |
| Thiobisphenol phosphite b | 0.5 | 0.5 | 0.1 | 0.3 | 0.5 | 0.3 | |
| Zn thiodipropionate | | 0.5 | | | | 0.5 | 0.5 |
| Sodium-4-hydroxy-3,5-di-t-butyl-benzyl sulfonate) | | | 0.5 | 0.5 | 0.5 | 0.5 | 0.5 |
| Induction time (minutes) (DTA at 180° C.) | 25.5 | 28.2 | 14.8 | 22.5 | 39.0 | 18.0 | <5 |
| Percent resid. thiobisphenolphosphite | 29 | 33 | 25 | 34 | 40 | 27 | ~10 |

* The thiobisphenol-phosphite in this example was replaced by 0.5 part of the reaction product of 1 mol of crotonaldehyde and 3 moles of 3-methyl-6-t-butyl phenol.

b 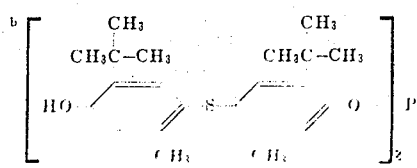

EXAMPLE 7

In this example, an ethylene-propylene block copolymer containing about 25 percent ethylene was compounded with the stabilizing additive shown below.

Ingredients were melt compounded on a two-roll mill (surface temperature 170°-177°C.); 4 × 4 × 0.10 in. films were pressed at 215°C. for 5 minutes. Portions of these films (about 2 × 2 in.) were placed on glass beads in a Petri dish and were covered with about 20 ml. of a blend consisting of 84.8 percent high-oil petroleum jelly, 15 percent low density polyethylene "fluff", and 0.2 percent 4,4'-thiobis-(3-methyl-6-t-butyl phenol) antioxidant. The Petri dishes were covered and placed in an oven at 70°C. for 250 hours. After removal from the jelly and wiping with a tissue, pieces of the film were then tested for DTA induction time at 180°C. while in contact with a copper dish as described hereinabove.

| Ingredients | Control | Ex. 7 |
|---|---|---|
| Copolymer | 100 | 100 |
| Conventional stabilizer* | 0.5 | 0.5 |
| Distearyl thiodipropionate | 0.25 | 0.25 |
| Thiobisphenol phosphite** | — | 0.5 |
| Induction time (minutes) | 5 | 56 |

*Reaction product of 3 moles of 3-methyl-6-t-butyl phenol and 1 mole of crotonaldehyde.

** 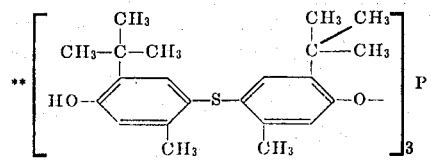

What I claim and desire to protect by Letters Patent is:

1. In an electrically conductive cable consisting essentially of a plurality of conducting wires individually coated with an olefin polymer containing a stabilizer against the degradative effects of the metal in the conducting wires and having the space between individual conducting wires filled with an amorphous, semi-solid, low molecular weight petroleum hydrocarbon melting at about 34° to 60°C., the improvement which comprises said stabilizer being about 0.05 to 1 percent by weight, based on polymer weight, of a hindered thiobisphenol phosphite having the general formula

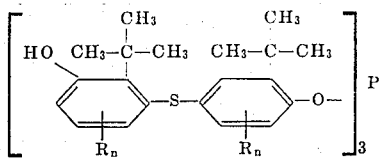

where R is methyl or t-butyl and $n$ is from 0 to 2.

2. The cable of claim 1 where the thiobisphenol phosphite is

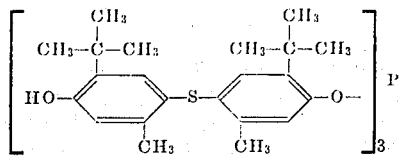

3. The cable of claim 1 where the polymer contains co-stabilizers in addition to the thiobisphenol phosphite.

4. The cable of claim 3 where the thiobisphenol phosphite is

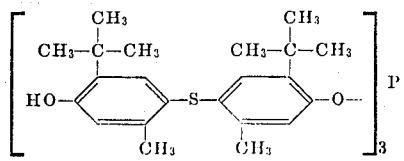

* * * * *

UNITED STATES PATENT OFFICE
CERTIFICATE OF CORRECTION

Patent No. 3,755,610                   Dated August 28, 1973

Inventor(s)   Frank H. McTigue

It is certified that error appears in the above-identified patent and that said Letters Patent are hereby corrected as shown below:

The present columns 1 through 6 should be cancelled and the attached columns 1 through 6 substituted therefor, as part of the Letters Patent.

Signed and sealed this 25th day of June 1974.

(SEAL)
Attest:

EDWARD M. FLETCHER, JR.                C. MARSHALL DANN
Attesting Officer                      Commissioner of Patents